(No Model.)
W. J. EASON.
Cotton Seed Planter.
No. 232,015.  Patented Sept. 7, 1880.
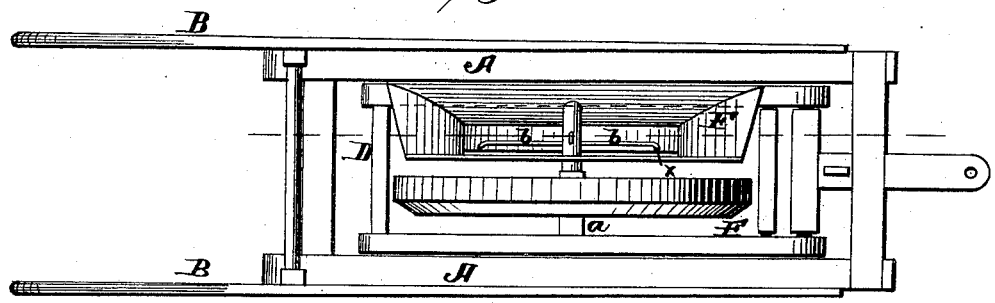
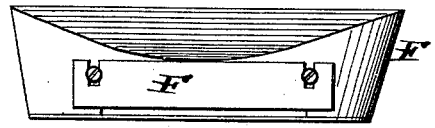
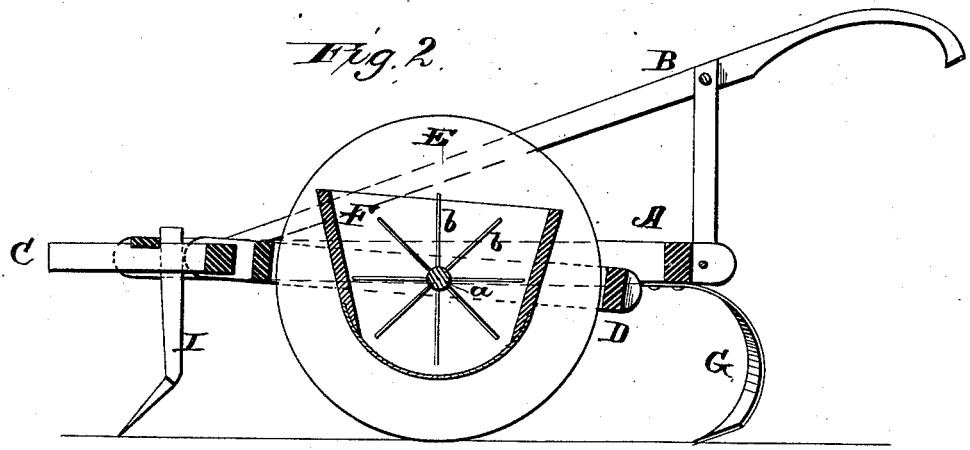
WITNESSES
Franck L. Ourand
H. Aubrey Toulmin
INVENTOR
W. J. Eason
By Alexander Mason
ATTORNEY

UNITED STATES PATENT OFFICE.

WILLIAM J. EASON, OF WOODBURY, GEORGIA.

COTTON-SEED PLANTER.

SPECIFICATION forming part of Letters Patent No. 232,015, dated September 7, 1880.

Application filed May 18, 1880. (No model.)

*To all whom it may concern:*

Be it known that I, WILLIAM J. EASON, of Woodbury, in the county of Meriwether, and in the State of Georgia, have invented certain new and useful Improvements in Cotton-Seed Planters; and I do hereby declare that the following is a full, clear, and exact description thereof, reference being had to the accompanying drawings, and to the letters of reference marked thereon, making a part of this specification.

This invention relates to certain improvements in that class of seed-planters constructed with a hopper having a longitudinal seed-delivering slot at the bottom, with adjustable regulating-slides, and provided with a rotating delivery-wheel having radial arms; and it consists in the construction and arrangement of a cotton-seed planter, as will be hereinafter more fully set forth.

In order to enable others skilled in the art to which my invention appertains to make and use the same, I will now proceed to describe its construction and operation, referring to the annexed drawings, in which—

Figure 1 is a plan view of my planter. Fig. 2 is a longitudinal section of the same, and Fig. 3 is a bottom view of the seed-hopper.

A represents the main frame, made in rectangular form, and provided with handles B B and tongue C.

Within the main frame A is another frame, D, swinging up and down on its forward end, it being pivoted on the cross-bar to which the tongue is attached, or in any other suitable manner.

In the swinging frame D is a cross-shaft, $a$, upon which is secured the wheel E. This shaft also passes through a hopper, F, secured in the swinging frame. This hopper has a slot or opening in its bottom for the passage of the seed, and an adjustable slide, F', for regulating the width of the seed-slot as required.

Within the hopper, to the shaft $a$, are secured a number of radial rods or arms, $b$, the ends of which are turned or curved, as shown at $x$, so as to agitate the seed and cause it to pass out at the seed-opening.

To the rear end of the swinging frame D are attached the coverers G, while to the front end of the main frame is attached the furrow-opener I.

The wheel E runs on the ground and rotates the shaft and stirrers, and these parts, with the hopper, being mounted in the swinging frame admits of the machine passing over stones or other obstructions without difficulty.

I am aware that cotton-seed planters consisting of a traveling frame provided with a hopper having slotted opening at its bottom for the passage of seed and regulating-slides to control such passage, and having rotating distributing-arms to deliver the seed through the opening, have been heretofore constructed, and such I do not claim, broadly.

Having thus fully described my invention, what I claim as new, and desire to secure by Letters Patent, is—

In a cotton-seed planter, the combination of an outer and inner frame, the latter carrying a stationary hopper provided with an adjustable sliding bottom, F', and furnishing journal-bearings for the supporting-wheel located within said frame and without the hopper, the shaft whereof is provided with vibrating radial agitating-bars $b$, working within the said hopper, substantially as and for the purposes herein set forth.

In testimony that I claim the foregoing I have hereunto set my hand this 3d day of May, 1880.

WILLIAM J. EASON.

Witnesses:
 H. AUBREY TOULMIN,
 A. W. MORGAN.